Patented Apr. 17, 1951

2,549,465

UNITED STATES PATENT OFFICE 2,549,465

PROCESS FOR BIOCHEMICAL PRODUCTION OF ENZYMES

Johannes C. Hoogerheide, Whitefish Bay Village, Wis., and Eugene G. Laughery, Omaha, Nebr., assignors to Pabst Brewing Company, Milwaukee, Wis., a corporation of Delaware No Drawing. Application February 11, 1948, Serial No. 7,714

4 Claims. (Cl. 195—96)

This invention relates to an improved process for production of both amylolytic and proteolytic enzymes by means of micro-organisms propagated under deep culture conditions. The organisms used in this process are of the type including *Bacillus subtilis* and *Bacillus mesentericus*, grown in submerged culture under conditions of aeration and enhanced agitation.

Heretofore growth of *Bacillus subtilis* and *Bacillus mesentericus* have been induced for the purpose of producing amylolytic and proteolytic enzymes by methods falling into two classes. The first class, most commonly used, produces quiescent growth of the micro-organisms in question on the surfaces of thin layers of nutrient solutions exposed to the air. The organisms grow in the form of a wrinkled matt on the surface of the culture medium. In this class of method nutrients are employed which are diverse in composition but are usually high in assimilable nitrogen in case of amylase production so as to enhance the rate and abundance of growth. Production of high yields of protease by this technique is obtained by using a medium of lower protein content but high in carbohydrate, e. g. 20 parts of carbohydrates for 1 part of organic nitrogen.

The second class of method heretofore proposed for amylase production consists in submerged culture growth of the micro-organisms in question in a nutrient of special character maintained alkaline by buffers and containing a very small maximum quantity of assimilable nitrogen. In this method finely divided air is caused to pass through the nutrient solution within which the micro-organisms are dispersed.

The first method, involving growth of the micro-organisms on shallow layers of culture medium is objectionable because in order to obtain desirably potent enzyme solutions, elaborate and expensive equipment is required and much labor cost is entailed.

The submerged growth method on the other hand enjoys distinct advantages from the standpoint of high yields per tank, low equipment cost and low labor requirements, but, as heretofore practiced for amylase production, does not produce satisfactory potencies because of restrictions of nitrogen contained in the nutrient.

Heretofore attempts to produce high yields of proteolytic and amylolytic enzymes by submerged culture methods, using high concentrations of organic nitrogen as nutrients, have failed. It is known that *Bacillus subtilis* and *Bacillus mesentericus* not only produce proteolytic and amylolytic enzymes under certain growth conditions but such organisms under certain other growth conditions seem to destroy or create conditions which destroy these enzymes after they are formed. These actions have been thought to be the cause of inconsequential yields of the enzymes in question when submerged growth cultures have been grown in high nitrogen nutrients. Whatever may be the cause, the experience has heretofore been that production of the desired enzymes in deep culture may not be successfully carried on with nutrients having sufficient nitrogen content to promote abundant and rapid growth.

Through the present invention, however, limitations heretofore restricting deep cultures growth of micro-organisms productive of proteolytic and amylolytic enzymes are overcome in a large measure. It is the discovery of the present invention that the desired result may be accomplished by using a nutrient fluid which is sufficiently rich in nutrients so as to allow abundant growth of the micro-organisms, and not only supplying finely divided air while growth is taking place but also, at the same time, maintaining a degree of mechanical agitation in the culture substantially exceeding the agitation induced by mere introduction of air in amounts corresponding with the biological demand attendant upon the abundant growth.

When this is done a number of advantages in addition to those inherent in the deep culture method follow, among them being a comparatively wide latitude in the choice of nutrient compositions, a fairly wide latitude in choice of degree of acidity or alkalinity of the culture medium and a diminished dependence upon maintenance of sterile conditions in the nutrient prior to inoculation. Either protease or amylase or combinations of both can be produced in high yield by the methods of the present invention with the same medium dependent upon time of harvesting. It has been found that protease is produced during the early phases of growth, reaching a maximum potency in from 16 to 30 hours, then gradually decreasing upon further incubation. Amylase production occurs in the latter phases of growth, reaching a maximum potency in from 24 to 72 hours incubation, then gradually decreasing upon further incubation.

A predetermined mixture of proteolytic and amylolytic enzymes may be obtained by this process by employment of a predetermined incubation period.

General conditions of the process

In carrying on the process of this invention, a nutrient composition is first prepared from suitable vegetable meals high in assimilable nitrogen such as defatted soya bean, peanut meal, cotton seed meal and the like, or products such as waste yeast, distillers' slop and the like, all of which are of moderate cost and which are hereinafter referred to as high protein feed-material. If desired, a slurry of such products may be used directly as the nutrient, or it may be digested under suitable conditions of temperature and pressure with the aid of chemical or biochemical digesting treatment.

This nutrient medium for best results should contain from 2 to 12% of one or more of the above mentioned ingredients and have a protein content of from 1 to 6%. The carbohydrate concentration both for amylase and protease production is inconsequential and the ratio of carbohydrate to protein is preferably low, for instance, less than one. The medium should have an initial pH in excess of 5.0 and not exceeding 8.5. If not falling within this range, the pH of the nutrient is appropriately adjusted. The medium is prepared in a tank of suitable size and preferably sterilized in this tank, although sterilization may at times be dispensed with. The nutrient thus prepared is then brought to a temperature of from 25° C. to 40° C., preferably about 35° C. whereupon it is inoculated with a culture of *Bacillus subtilis* or *Bacillus mesentericus* or other suitable micro-organisms.

Incubation is then carried forward with the culture in the form of an aerated submerged growth in a suitable tank or other vessel of substantial depth. During such incubation, the temperature is regulated so as to remain within the range of approximately 28 to 38° C. and considerable quantities of air, such as one tenth to one volume of free air per volume of culture per minute, adequate for the demand of the micro-organisms is continually introduced through porous stone filters or other sparging means so as to deliver the air into the deep culture in finely divided form. As an essential aspect of this invention and while growth takes place, the entire content of the deep culture is maintained in a state of active agitation, substantially exceeding that resulting from the mere introduction of air.

Growth of the deep culture is continued under the conditions above stated until maximum concentration of the desired enzyme is developed. Ordinarily the period of incubation will have a duration of from 16 to 40 hours if protease is desired and from 1 to 3 days when amylase is desired as the main product.

Upon completion of incubation the enzyme containing liquor is then separated from the bacteria and debris by known methods such as by filtration, centrifugation, settling and the like.

The nutrient medium employed is preferably one high in organic nitrogen and low in carbohydrate such as is furnished by soya beans, peanuts, cotton seed meals, yeast and the like. Nutrients containing 30% and upwards of assimilable protein on a dry basis are preferred, although nutrients poorer in protein are advantageously treated by this process.

The high degree of aeration and mechanical agitation maintained during growth of the culture, together with the abundant assimilable protein supply at hand, seems to stimulate the organism in producing both proteolytic and amylolytic enzymes and prevents creation of unfavorable conditions such as acid production as well as physiological changes due to inadequate nutrition or respiration or both, which lead to decreased enzyme production, such as heretofore has been encountered in deep culture methods for the production of protease and amylase.

Specific examples

As a specific example of an instance of the practice of this invention, a nutrient may be prepared by mixing 8% by weight of defatted soya bean flour with water in a pressure tank of 400 gallon capacity where it is heated under steam pressure of 20 pounds per square inch for one hour. The nutrient may then be cooled to a temperature of between 30° C. to 37° C. and upon reaching this temperature may be inoculated with a 24 to 28 hour culture of *Bacillus subtilis* or *Bacillus mesentericus*. Preferably the vessel in which the nutrient medium is prepared is of substantial depth and is provided with sparging means placed at a low level and air is introduced through the same in quantity to meet the growth demands of the culture, for instance one third of the liquid volume as free flowing air per minute. The vessel, within which the culture is grown, is also preferably provided with effective mechanical agitating means such as, for example, propellers which are continually rotated at a speed of 270 R. P. M. in order to maintain the culture at a very rapid state of agitation substantially exceeding that induced by the introduction of the air. Upon attaining a maximum concentration of enzyme, usually after 16 to 30 hours for bacterial protease and 24 to 72 hours for bacterial amylase, the culture may be permitted to remain quiescent in the tank for the purpose of separating or partially separating a clarified liquid containing the enzyme substances. If desired, other or additional clarifying steps may be applied to the resulting culture medium for the purpose of producing a clarified enzyme solution.

The clarified enzyme solution thus prepared containing protease and amylase as principal enzymes, may be utilized directly as such or may be concentrated to produce a concentrated liquor by means of vacuum evaporation or may be reduced to a dry powder as, for example, through the use of vacuum dryers or by precipitation with such agents as, for example, alcohol, acetone or high salt concentrations. The enzyme containing substances may be used for any of the starch or protein modification requirements which occur in industry as, for example, in textile desizing, sizing, brewing, distilling, leather making, paper making and others.

The enzyme potencies obtained through the practice of the above named specific instance compares favorably with enzyme potencies obtained by methods heretofore employed using elaborate and expensive shallow layer culture methods.

The inoculum may be built up in accordance with well known methods in the art from pure strains of organisms characterized by their effectiveness in production of proteolytic as well as amyloytic enzymes and is used in proportions in keeping with known practice.

In another specific instance this invention may be practiced without resort to sterilization by preparing a nutrient medium from a slurry formed from peanut meal containing from 6 to 10% by weight of meal. This nutrient slurry may then be introduced into a vessel provided with aeration and agitation means as described in the foregoing specific example and inoculated with a somewhat greater quantity of inoculum than is required in the case of a sterilized nutrient medium. The temperature of the nutrient is maintained as above between 30° C. to 37° C. and introduction of air and rapid agitation are carried forward. Under this simplified procedure, a very substantial yield of enzyme is obtained and an enzyme containing liquor of substantial potency results, which may be recovered for use in the manner described above. While operating with unsterilized high nitrogen nutrients, ample inoculation and maintenance of the conditions for growth above set forth, results in a rate of growth of the organisms sufficient to outgrow commonly encountered contaminants, thus rendering operation with unsterilized media practical.

We claim:

1. The process of preparing enzyme substances of the group consisting of proteolytic enzyme and amylolytic enzyme which consists of preparing a nutrient medium containing a predominant proportion of assimilable nitrogen, then inoculating said medium with a micro-organism selected from the group consisting of *Bacillus subtilis* and *Bacillus mesentericus* to form a culture; holding said culture as a body of substantial depth, then while maintaining the temperature at about 25° C. to 40° C. introducing air into said culture at a volume rate of flow exceeding the rate of biological growth demand for air of the micro-organisms contained in said culture and distributing said air in said culture in finely divided form while continuously vigorously mechanically agitating said culture to an extent in excess of that resulting from said introduction of air, and then separating an enzyme containing liquor from the micro-organisms and debris resulting from said growth.

2. The process of preparing enzyme substances which consists in preparing a nutrient medium comprising water and from 2% to 12% of a nutrient containing a high proportion of assimilable nitrogen, sterilizing said nutrient medium, adjusting the pH of said medium to be between 5.0 and 8.5; then inoculating said medium with a micro-organism selected from the group comprising *Bacillus subtilis* and *Bacillus mesentericus* to form a culture, holding said culture as a body of substantial depth, then, while maintaining the temperature at about 25° C. to 40° C. introducing air and distributing this air in finely divided form through the medium while continuously mechanically agitating said culture to an extent in excess of that resulting from said introduction of air, and then separating an enzyme containing liquor from the micro-organisms and debris resulting from said growth.

3. The process of preparing a predetermined mixture of amylolytic and proteolytic enzyme substances which consist in preparing a nutrient medium comprising water and from 2% to 12% of nutrient consisting of high protein feedmaterial, sterilizing said nutrient medium, adjusting the pH of said nutrient medium to a pH between 5.0 and 8.5, bringing the temperature of said nutrient medium to 25° C. to 40° C., then inoculating said medium with a micro-organism selected from the group comprising *Bacillus subtilis* and *Bacillus mesentericus* to form a culture, holding said culture as a body of substantial depth, then while maintaining the temperature of said culture within the range of 25° C. to 40° C. introducing air and distributing the same in finely divided form through said culture at a volume rate of flow per minute exceeding one tenth of the culture body by volume, while continuously vigorously mechanically agitating said culture to an extent in excess of that resulting from said introduction of air, continuing said aeration and agitation until a predetermined mixture of proteolytic and amylolytic enzymes is produced, and then separating a liquor containing said enzyme mixture from the micro-organisms and debris resulting from said growth.

4. The process of preparing an enzyme of the group consisting of amylolytic and proteolytic enymes which consists in preparing a nutrient medium comprising water and from 2% to 12% of nutrient derived from high protein feedmaterial; sterilizing said nutrient medium; adjusting the pH of said nutrient to lie between 5.0 and 8.5; bringing the temperature of said nutrient medium to 25° to 40° C.; then inoculating said medium with a micro-organism selected from the group comprising *Bacillus subtilis* and *Bacillus mesentericus* to form a culture; holding said culture as a body of substantial depth; then while maintaining the temperature within the range of 25° C. to 40° C. introducing air and distributing the same in finely divided form through the culture medium at a rate exceeding one tenth of the culture medium volume of free flowing air per minute, while continuously vigorously mechanically agitating said culture to an extent in excess of that resulting from said introduction of air, while growth of said micro-organism takes place; and then separating an enzyme containing liquor from the micro-organisms and debris, resulting from said growth.

JOHANNES C. HOOGERHEIDE.
EUGENE G. LAUGHERY.

REFERENCES CITED

The following references are of record in the file of this patent:

UNITED STATES PATENTS

| Number | Name | Date |
|---|---|---|
| 1,882,112 | Boidin et al. | Oct. 11, 1932 |
| 1,985,267 | Wallerstein et al. | Dec. 25, 1934 |
| 2,302,079 | Waldmann | Nov. 17, 1942 |
| 2,530,210 | Smythe et al. | Nov. 14, 1950 |